US009105214B2

(12) United States Patent
Ahn et al.

(10) Patent No.: US 9,105,214 B2
(45) Date of Patent: Aug. 11, 2015

(54) FLAT PANEL DISPLAY AND METHOD FOR DRIVING THE SAME WITH MULTIPLE DRIVING POWER MODES

(71) Applicant: LG Display Co., Ltd., Seoul (KR)

(72) Inventors: Ji-Young Ahn, Gyeonggi-do (KR); Bu-Yeol Lee, Gyeonggi-do (KR); Jong-Keun Shin, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 127 days.

(21) Appl. No.: 13/676,268

(22) Filed: Nov. 14, 2012

(65) Prior Publication Data

US 2013/0120343 A1 May 16, 2013

(30) Foreign Application Priority Data

Nov. 14, 2011 (KR) ........................ 10-2011-0118350

(51) Int. Cl.
*G06F 3/038* (2013.01)
*G09G 1/00* (2006.01)
*G09G 3/00* (2006.01)

(52) U.S. Cl.
CPC .................. *G09G 1/005* (2013.01); *G09G 3/00* (2013.01); *G09G 2330/00* (2013.01); *G09G 2330/022* (2013.01); *G09G 2354/00* (2013.01)

(58) Field of Classification Search
CPC ................................. G09G 2330/00–2330/028
USPC .......................................................... 345/211
See application file for complete search history.

(56) References Cited

U.S. PATENT DOCUMENTS

| | | | | |
|---|---|---|---|---|
| 7,050,049 | B2 * | 5/2006 | Byun | 345/211 |
| 2003/0193472 | A1 * | 10/2003 | Powell | 345/102 |
| 2010/0171751 | A1 * | 7/2010 | Kim | 345/589 |
| 2012/0044142 | A1 * | 2/2012 | Wu | 345/158 |
| 2012/0206431 | A1 * | 8/2012 | Matsuo | 345/211 |

FOREIGN PATENT DOCUMENTS

| | | | |
|---|---|---|---|
| CN | 201130312 | Y | 10/2008 |
| JP | 2006-067056 | A | 3/2006 |
| TW | M394544 | U | 12/2010 |
| WO | 2011/052928 | A2 | 5/2011 |

OTHER PUBLICATIONS

Office Action dated Dec. 3, 2014, issued by the State Intellectual Property Office of China in Chinese Patent Application No. 201210457591.6.

* cited by examiner

*Primary Examiner* — Roy Rabindranath
(74) *Attorney, Agent, or Firm* — Morgan, Lewis & Bockius LLP

(57) ABSTRACT

Disclosed herein are a flat panel display which is capable of reducing consumption of standby power, and a method for driving the same. The flat panel display includes a display unit for displaying an image, a driving circuit for controlling driving of the display unit, a receiver for receiving a user command, and a power supply unit for setting a power mode to a driving mode or a standby mode according to a predefined power setting or the user command, and supplying driving power to the display unit, driving circuit and receiver in the driving mode and only to the receiver in the standby mode. When the power mode is set to the standby mode, the power supply unit generates the driving power using a battery contained therein and supplies the generated driving power to the receiver, and cuts off input of external power.

14 Claims, 6 Drawing Sheets

FLAT PANEL DISPLAY AND METHOD FOR DRIVING THE SAME WITH MULTIPLE DRIVING POWER MODES

This application claims the benefit of Korean Patent Application No. 10-2011-0118350, filed on Nov. 14, 2011, which is hereby incorporated by reference as if fully set forth herein.

BACKGROUND OF THE INVENTION

1. Field of the Invention

The present invention relates to a flat panel display which is capable of reducing consumption of standby power, and a method for driving the same.

2. Discussion of the Related Art

Recently, a flat panel display, among display devices, has come into widespread use owing to characteristics such as excellent picture quality, lightness, thinness, low power consumption, etc.

In particular, flat panel displays have often been used as televisions (TVs) in homes or display devices which display advertisements or various information in public. Such a flat panel display, installed as a household TV or installed in public to display an advertisement or information, is supplied with driving power through a power plug. However, the flat panel display has a disadvantage in that power is consumed even in a standby mode in which an image is not displayed.

For reference, in the flat panel display, only a minimum of units for sensing a user command operate in the standby mode, and power consumed at that time is referred to as standby power. The standby power of the flat panel display is continuously consumed and wasted so far as the power plug is not physically unplugged.

SUMMARY OF THE INVENTION

Accordingly, the present invention is directed to a flat panel display and a method for driving the same that substantially obviate one or more problems due to limitations and disadvantages of the related art.

An object of the present invention is to provide a flat panel display which is capable of reducing consumption of standby power, and a method for driving the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a flat panel display includes a display unit for displaying an image, a driving circuit for controlling driving of the display unit, a receiver for receiving a user command, and a power supply unit for setting a power mode to a driving mode or a standby mode according to a predefined power setting or the user command, and supplying driving power to the display unit, driving circuit and receiver in the driving mode and only to the receiver in the standby mode, wherein the power supply unit, when the power mode is set to the standby mode, generates the driving power using a battery contained therein and supplies the generated driving power to the receiver, and cuts off input of external power.

The power supply unit may include the battery, a switch for switching the input of the external power supplied through a power plug, a power generator for generating the driving power using battery power supplied from the battery or the external power supplied from the switch, and a power supply controller for setting the power mode to the driving mode or standby mode according to the power setting or user command and controlling the switch and the power generator according to the set power mode.

In another aspect of the present invention, a flat panel display includes a display unit for displaying an image, a driving circuit for controlling driving of the display unit, a receiver for receiving a user command, and a power supply unit for setting a power mode to a driving mode or a standby mode according to a predefined power setting or the user command, and supplying driving power to the display unit, driving circuit and receiver in the driving mode and only to the receiver in the standby mode, wherein the power supply unit analyzes real-time power information provided from a smart grid and a remaining capacity of a battery contained therein and generates the driving power using the battery or external power according to a result of the analysis.

The power supply unit may include the battery, a switch for switching input of the external power supplied through a power plug, a power generator for generating the driving power using battery power supplied from the battery or the external power supplied from the switch, a smart grid unit for periodically analyzing the real-time power information provided from the smart grid, and generating a first control signal upon determining, based on a result of the analysis, that consumption of the external power is inefficient, a measurement unit for analyzing the remaining capacity of the battery, and generating a second control signal upon determining, based on a result of the analysis, that the remaining capacity of the battery exceeds a predefined reference capacity, and a power supply controller for setting the power mode to the driving mode or standby mode according to the power setting or user command and controlling the switch and the power generator according to the set power mode, the power supply controller, when the first and second control signals are simultaneously provided, performing a control operation to generate the driving power using the battery and cut off the input of the external power.

The receiver may include a motion sensor for sensing a user motion, and generating a third control signal when there is no user motion for a predefined reference time, wherein the power supply controller of the power supply unit operates in response to the third control signal to set the power mode to the standby mode and perform a control operation to supply the driving power only to the motion sensor.

In another aspect of the present invention, a method for driving a flat panel display, which includes a display unit for displaying an image, a driving circuit for controlling driving of the display unit, and a receiver for receiving a user command, includes setting a power mode to a driving mode or a standby mode according to a predefined power setting or the user command, generating driving power using external power when the power mode is set to the driving mode and supplying the generated driving power to the display unit, driving circuit and receiver, and generating the driving power using a battery contained in the flat panel display when the power mode is set to the standby mode and supplying the generated driving power to the receiver, and cutting off input of the external power.

In a further aspect of the present invention, a method for driving a flat panel display, which includes a display unit for displaying an image, a driving circuit for controlling driving of the display unit, and a receiver for receiving a user command, includes setting a power mode to a driving mode or a standby mode according to a predefined power setting or the user command, analyzing real-time power information provided from a smart grid and a remaining capacity of a battery contained in the flat panel display and generating driving power using the battery or external power according to a result of the analysis, supplying the driving power to the display unit, driving circuit and receiver when the power mode is set to the driving mode, and supplying the driving power to the receiver when the power mode is set to the standby mode.

The analyzing may include periodically analyzing the real-time power information provided from the smart grid, and generating a first control signal upon determining, based on a result of the analysis, that consumption of the external power is inefficient, and analyzing the remaining capacity of the battery, and generating a second control signal upon determining, based on a result of the analysis, that the remaining capacity of the battery exceeds a predefined reference capacity.

The generating the driving power may include generating the driving power using the battery when the first and second control signals are simultaneously provided, and cutting off input of the external power.

The method may further include sensing a user motion by a motion sensor, generating a third control signal when there is no user motion for a predefined reference time, and setting the power mode to the standby mode in response to the third control signal and then supplying the driving power only to the motion sensor.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

A flat panel display of the present invention may be applied to all flat panel displays which are fixedly mounted in places adjacent to outlets and are supplied with external power through power plugs. For example, the flat panel display of the present invention may be applied to TVs in homes or flat panel displays manufactured for the purpose of displaying advertisements or various information in public.

Figure 1:
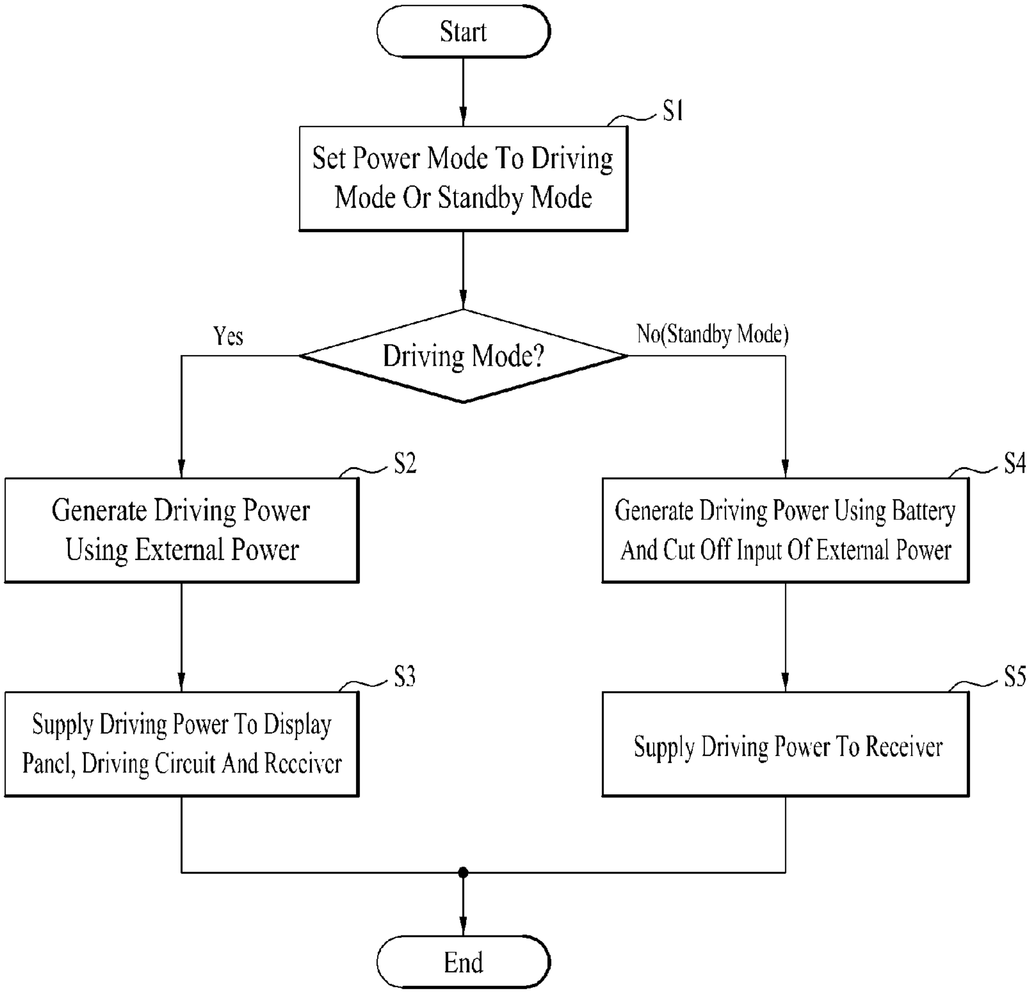
FIG. 1 is a flowchart illustrating a method for driving a flat panel display according to a first embodiment of the present invention.
Figure 2:
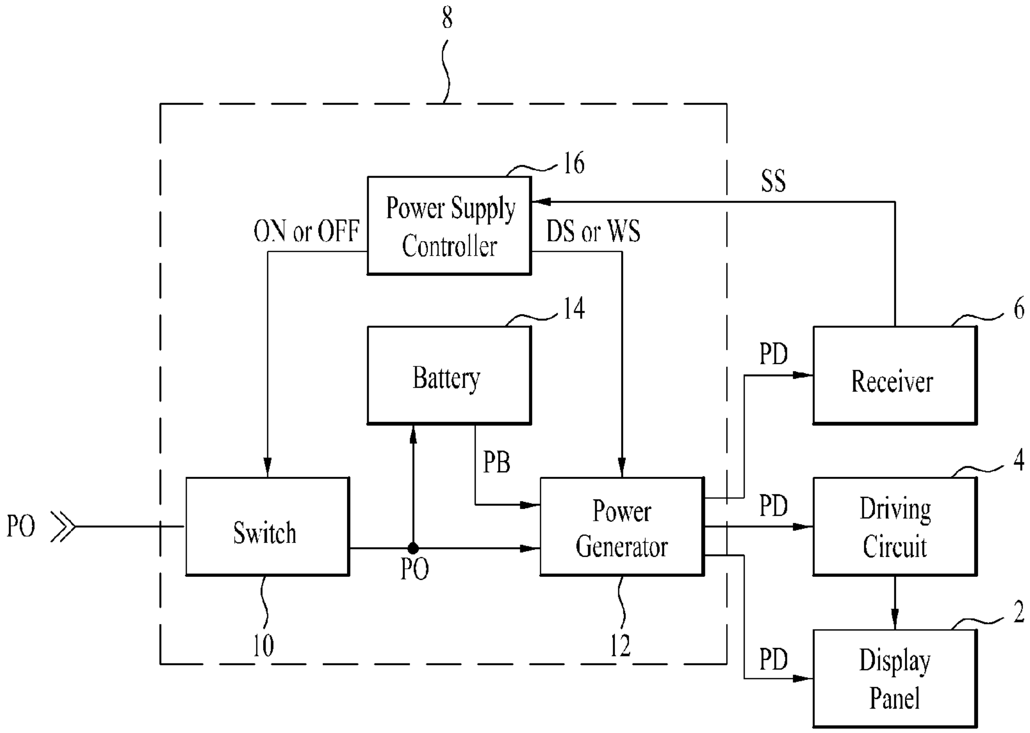
FIG. 2 is a block diagram of the flat panel display according to the first embodiment of the present invention.

FIG. 1 is a flowchart illustrating a method for driving a flat panel display according to a first embodiment of the present invention, and FIG. 2 is a block diagram of the flat panel display according to the first embodiment of the present invention.

The driving method of the first embodiment shown in FIG. 1 includes: setting a power mode to a driving mode or a standby mode according to a predefined power setting or a user command (S1); generating driving power using external power when the power mode is set to the driving mode and supplying the generated driving power to a display panel, a driving circuit and a receiver (S2 and S3); and generating the driving power using a battery contained in the flat panel display when the power mode is set to the standby mode and supplying the generated driving power to the receiver, and cutting off input of the external power (S4 and S5).

In this driving method of the first embodiment, in order to reduce consumption of standby power, a power supply unit includes the battery, and generates the driving power using the battery when the power mode is set to the standby mode. Also, when the power mode is set to the standby mode, the power supply unit cuts off the input of the external power such that the amount of the external power consumed is zero. As a result, in the first embodiment, it is possible to reduce consumption of the standby power in the standby mode. The flat panel display according to this first embodiment will hereinafter be described in detail.

The flat panel display shown in FIG. 2 includes a display panel 2 for displaying an image, a driving circuit 4 for controlling driving of the display panel 2, a receiver 6 for receiving a user command, and a power supply unit 8 for setting a power mode to a driving mode or a standby mode according to a predefined power setting or the user command, and supplying driving power PD to the display panel 2, driving circuit 4 and receiver 6 in the driving mode and only to the receiver 6 in the standby mode.

The display panel 2 includes a plurality of data lines (not shown) and a plurality of gate lines (not shown) which intersect each other. Sub-pixels are defined respectively at intersections of the data lines and the gate lines. A thin film transistor is formed in each sub-pixel. The thin film transistor supplies a data voltage from a corresponding one of the data lines to a corresponding one of the sub-pixels in response to a scan signal from a corresponding one of the gate lines. This display panel 2 may be a display panel of any one of a liquid crystal display (LCD), an organic light emitting diode (OLED) display and an electrophoretic display (EPD).

The driving circuit 4 includes a plurality of driving circuits for driving the display panel 2. For example, the driving circuit 4 may include a data driver for driving the data lines, a gate driver for driving the gate lines, and a timing controller for controlling driving timings of the data driver and gate driver.

The data driver converts digital video data input from the timing controller into gamma-compensated voltages to generate data voltages, and supplies the generated data voltages to the data lines. The gate driver generates scan signals synchronized with the data voltages supplied to the data lines and sequentially supplies the generated scan signals to the gate lines. The timing controller arranges digital video data externally input thereto and transmits the arranged data to the data driver. The timing controller controls the driving timings of the data driver and gate driver using timing signals externally input thereto, such as a vertical synchronization signal Vsync, a horizontal synchronization signal Hsync, a data enable signal DE and a dot clock DCLK.

The receiver 6 is a device that receives the user command, and may be a remote controller receiver, a wireless signal sensor or a local key. The receiver 6 may be any device for recognizing the user command. The receiver 6 supplies the received user command as a sense signal SS to a power supply controller 16 of the power supply unit 8.

The power supply unit 8 generates the driving power PD and supplies the generated driving power PD to the display panel 2, driving circuit 4 and receiver 6. To this end, the power supply unit 8 includes a rechargeable battery 14, a switch 10 for switching input of external power PO supplied through a power plug, a power generator 12 for generating the driving power PD using battery power PB supplied from the battery 14 or the external power PO supplied from the switch 10, and a power supply controller 16 for setting the power mode to the driving mode or standby mode and controlling the switch 10 and the power generator 12 according to the set power mode.

The battery 14 is charged using the external power PO. Electricity charged in the battery 14 is supplied as the battery power PB to the power generator 12 in the standby mode.

The switch 10 passes or cuts off the input of the external power PO in response to a switch on signal ON or switch off signal OFF from the power supply controller 16. In response to the switch on signal ON, the switch 10 passes the input of the external power PO and supplies the external power PO to the battery 14 and the power generator 12. On the other hand, in response to the switch off signal OFF, the switch 10 cuts off the input of the external power PO such that the amount of the external power PO consumed is zero.

The power generator 12 generates the driving power PD using the external power PO or battery power PB. The power generator 12 selectively supplies the driving power PD to the display panel 2, driving circuit 4 and receiver 6 in response to a driving mode signal DS or standby mode signal WS from the power supply controller 16. In response to the driving mode signal DS, the power generator 12 generates the driving power PD using the external power PO supplied from the switch 10 and supplies the generated driving power PD to the display panel 2, driving circuit 4 and receiver 6. On the other hand, in response to the standby mode signal WS, the power generator 12 generates the driving power PD using the battery power PB supplied from the battery 14 and supplies the generated driving power PD to the receiver 6.

The power supply controller 16 sets the power mode in response to the sense signal SS from the receiver 6 or sets the power mode according to a predefined power setting. The power mode may be personally commanded by the user using a remote controller or other external devices. The predefined power setting may be, for example, a setting for changing the power mode to the standby mode when there is no user command for a predefined reference time.

The power supply controller 16 controls the switch 10 and the power generator 12 according to the set power mode. In detail, when the power mode is set to the driving mode, the power supply controller 16 generates the switch on signal ON and supplies it to the switch 10, and generates the driving mode signal DS and supplies it to the power generator 12. On the other hand, when the power mode is set to the standby mode, the power supply controller 16 generates the switch off signal OFF and supplies it to the switch 10, and generates the standby mode signal WS and supplies it to the power generator 12.

Next, a description will be given of a flat panel display and a driving method thereof according to a second embodiment of the present invention.

Figure 3:
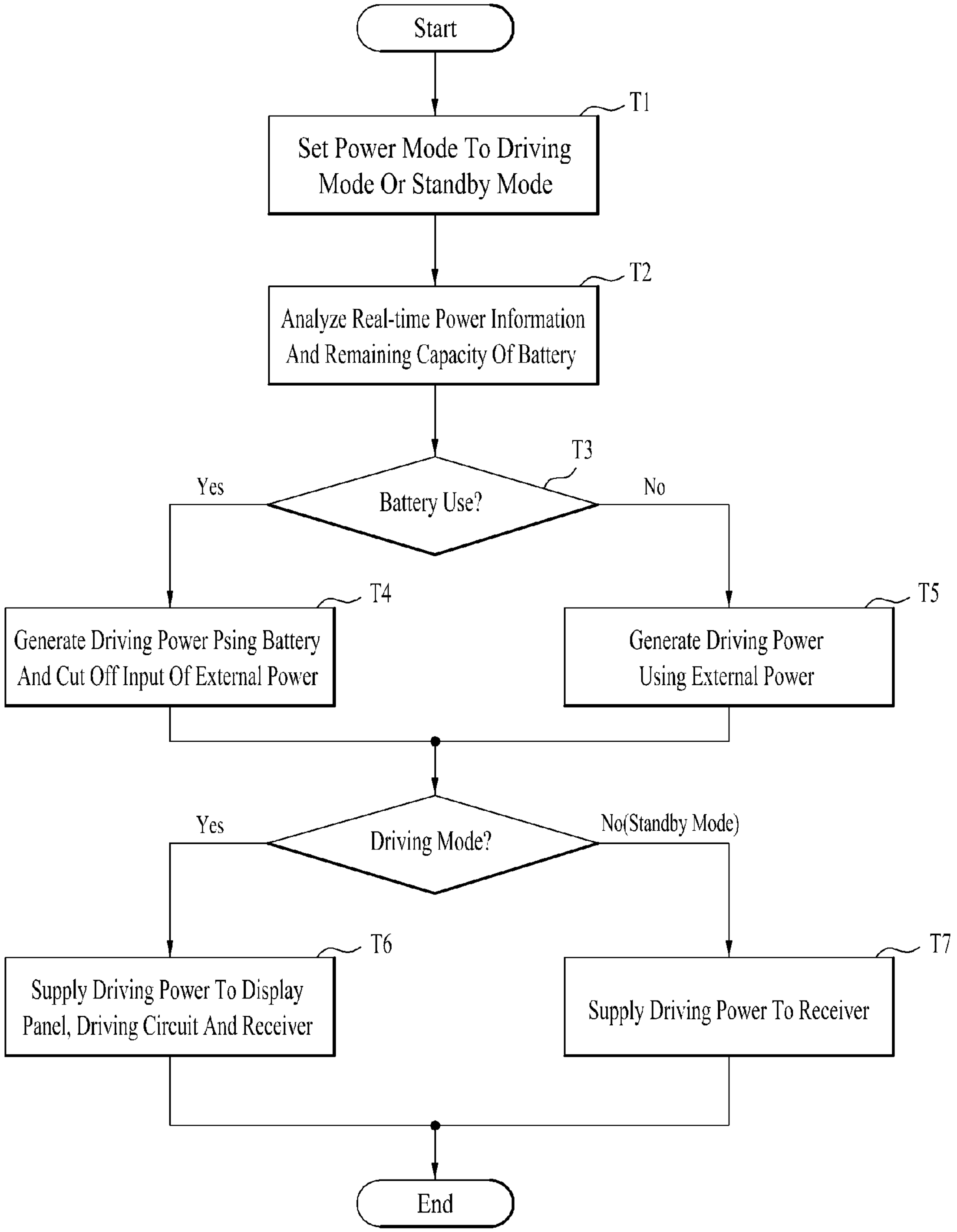
FIG. 3 is a flowchart illustrating a method for driving a flat panel display according to a second embodiment of the present invention.
Figure 4:
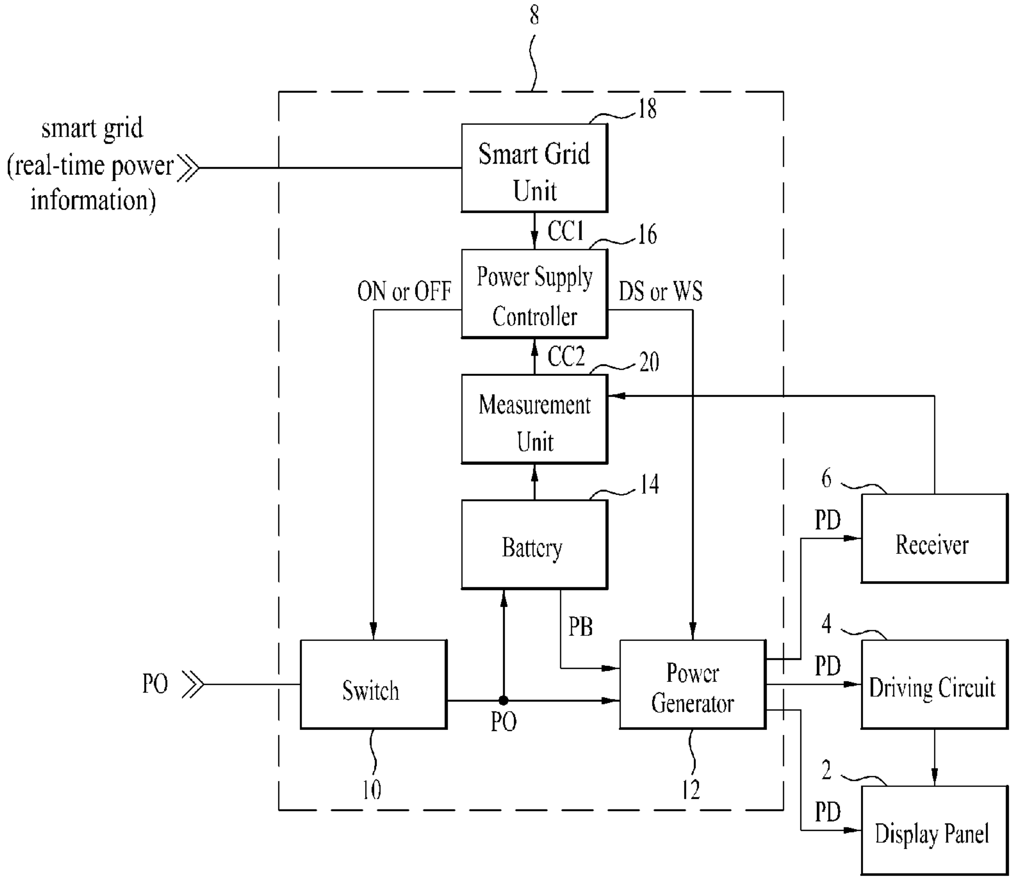
FIG. 4 is a block diagram of the flat panel display according to the second embodiment of the present invention.

FIG. 3 is a flowchart illustrating the method for driving the flat panel display according to the second embodiment, and FIG. 4 is a block diagram of the flat panel display according to the second embodiment.

The driving method of the second embodiment shown in FIG. 3 includes: setting a power mode to a driving mode or a standby mode according to a predefined power setting or a user command (T1); analyzing real-time power information provided from a smart grid and the remaining capacity of a battery contained in the flat panel display to determine whether to use the battery (T2 and T3); generating driving power using the battery or external power according to a result of the determination (T4 and T5); supplying the generated driving power to a display panel, a driving circuit and a receiver when the power mode is set to the driving mode (T6); and supplying the generated driving power to the receiver when the power mode is set to the standby mode (T7).

In this driving method of the second embodiment, an analysis is made of the real-time power information provided from the smart grid and the remaining capacity of the battery, and the driving power is generated by selectively using the external power or battery power according to a result of the analysis. When the driving power is generated using the battery power, input of the external power is cut off, so that the amount of the external power consumed is zero. As a result, in the second embodiment, consumption of standby power can be reduced by selectively consuming the external power. The flat panel display according to this second embodiment will hereinafter be described in detail.

The flat panel display shown in FIG. 4 includes a display panel 2 for displaying an image, a driving circuit 4 for controlling driving of the display panel 2, a receiver 6 for receiving a user command, and a power supply unit 8 for setting a power mode to a driving mode or a standby mode according to a predefined power setting or the user command, and supplying driving power PD to the display panel 2, driving circuit 4 and receiver 6 in the driving mode and only to the receiver 6 in the standby mode. In particular, the power supply unit 8 analyzes real-time power information provided from a smart grid and the remaining capacity of a battery 14 contained therein and generates the driving power PD using the battery 14 or external power PO according to a result of the analysis.

On the other hand, the components (the display panel, driving circuit and receiver) of the flat panel display of the second embodiment other than the power supply unit 8 are the same as those in the first embodiment, and a description thereof will thus be replaced by the above description.

The power supply unit 8 includes the battery 14, a switch 10, a power generator 12, a smart grid unit 18, a measurement unit 20, and a power supply controller 16.

The battery 14 is charged using the external power PO. Although the battery 14 has been described as being contained in the power supply unit 8, it may be an external battery.

The switch 10 passes or cuts off input of the external power PO in response to a switch on signal ON or switch off signal OFF from the power supply controller 16. In response to the switch on signal ON, the switch 10 passes the input of the external power PO and supplies the external power PO to the battery 14 and the power generator 12. On the other hand, in response to the switch off signal OFF, the switch 10 cuts off the input of the external power PO such that the amount of the external power PO consumed is zero.

The power generator 12 generates the driving power PD using the external power PO or battery power PB. The power generator 12 selectively supplies the driving power PD to the display panel 2, driving circuit 4 and receiver 6 in response to a driving mode signal DS or standby mode signal WS from the power supply controller 16. In response to the driving mode signal DS, the power generator 12 supplies the driving power PD to the display panel 2, driving circuit 4 and receiver 6. On the other hand, in response to the standby mode signal WS, the power generator 12 supplies the driving power PD to the receiver 6.

The smart grid unit 18 analyzes the real-time power information provided from the smart grid to generate a first control signal CC1. In detail, the smart grid unit 18 periodically analyzes the real-time power information to determine whether to use the external power PO. Upon determining that the consumption of the external power PO (in terms of energy consumption) is currently inefficient, the smart grid unit 18 generates the first control signal CC1. The first control signal CC1 is a signal for cutting off the input of the external power PO and generating the driving power PD using the battery power BP.

For reference, the smart grid is a next-generation power network technology in which a power supplier and a power consumer exchange information with each other in real time to optimize energy efficiency. Provided that the smart grid is commercially available, the power supplier can flexibly adjust power supply according to power demand and apply different electric charges at different time zones.

In the second embodiment, the smart grid unit 18 is connected with the smart grid to grasp a time zone at which energy consumption is optimum (a time zone at which the electric charge is low). At a time zone at which energy consumption is optimum, the external power PO is used. However, at a time zone at which energy consumption is inefficient (at a time zone at which the electric charge is high), the input of the external power PO is cut off and the battery 14 is used.

The measurement unit 20 analyzes the remaining capacity of the battery 14 to generate a second control signal CC2. The measurement unit 20 periodically measures the remaining capacity of the battery 14 to determine whether to use the external power PO. Upon determining that the remaining capacity of the battery 14 is sufficient, the measurement unit 20 generates the second control signal CC2. The second control signal CC2 is a signal for cutting off the input of the external power PO and generating the driving power PD using the battery power BP. In this regard, when the remaining capacity of the battery 14 exceeds a predefined reference capacity, the measurement unit 20 generates the second control signal CC2.

The power supply controller 16 sets the power mode in response to a sense signal SS from the receiver 6 or sets the power mode according to a predefined power setting. The power mode may be personally commanded by the user using a remote controller or other external devices. The predefined power setting may be, for example, a setting for changing the power mode to the standby mode when there is no user command for a predefined reference time.

The power supply controller 16 controls the switch 10 and the power generator 12 according to the set power mode. Also, when the first and second control signals CC1 and CC2 are simultaneously provided, the power supply controller 16 performs a control operation to generate the driving power PD using the battery 14 and cut off the input of the external power PO.

In detail, the power supply controller 16 controls the switch 10 in response to the first and second control signals CC1 and CC2. That is, when the first and second control signals CC1 and CC2 are simultaneously provided, the power supply controller 16 controls the switch 10 to generate the driving power PD using the battery 14 instead of the external power PO. To this end, when the first and second control signals CC1 and CC2 are simultaneously provided, the power supply controller 16 generates the switch off signal OFF and supplies it to the switch 10. On the other hand, when the first and second control signals CC1 and CC2 are not simultaneously provided, the power supply controller 16 controls the switch 10 to generate the driving power PD using the external power PO. To this end, when the first and second control signals CC1 and CC2 are not simultaneously provided, the power supply controller 16 generates the switch on signal ON and supplies it to the switch 10.

Also, the power supply controller 16 controls the switch 10 and the power generator 12 according to the set power mode. In detail, when the power mode is set to the driving mode, the power supply controller 16 generates the driving mode signal DS and supplies it to the power generator 12. On the other hand, when the power mode is set to the standby mode, the power supply controller 16 generates the standby mode signal WS and supplies it to the power generator 12.

Next, a description will be given of a flat panel display and a driving method thereof according to a third embodiment of the present invention.

Figure 5:
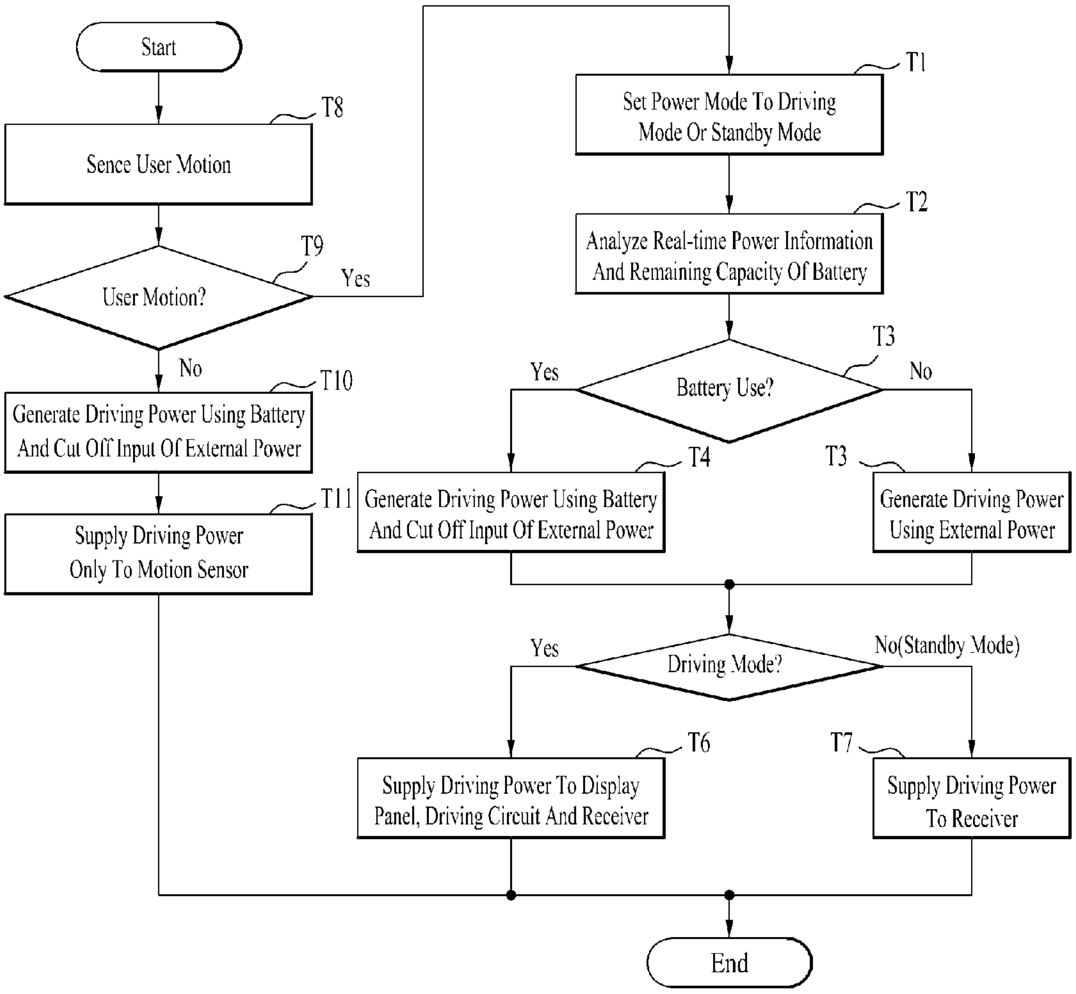
FIG. 5 is a flowchart illustrating a method for driving a flat panel display according to a third embodiment of the present invention.
Figure 6:
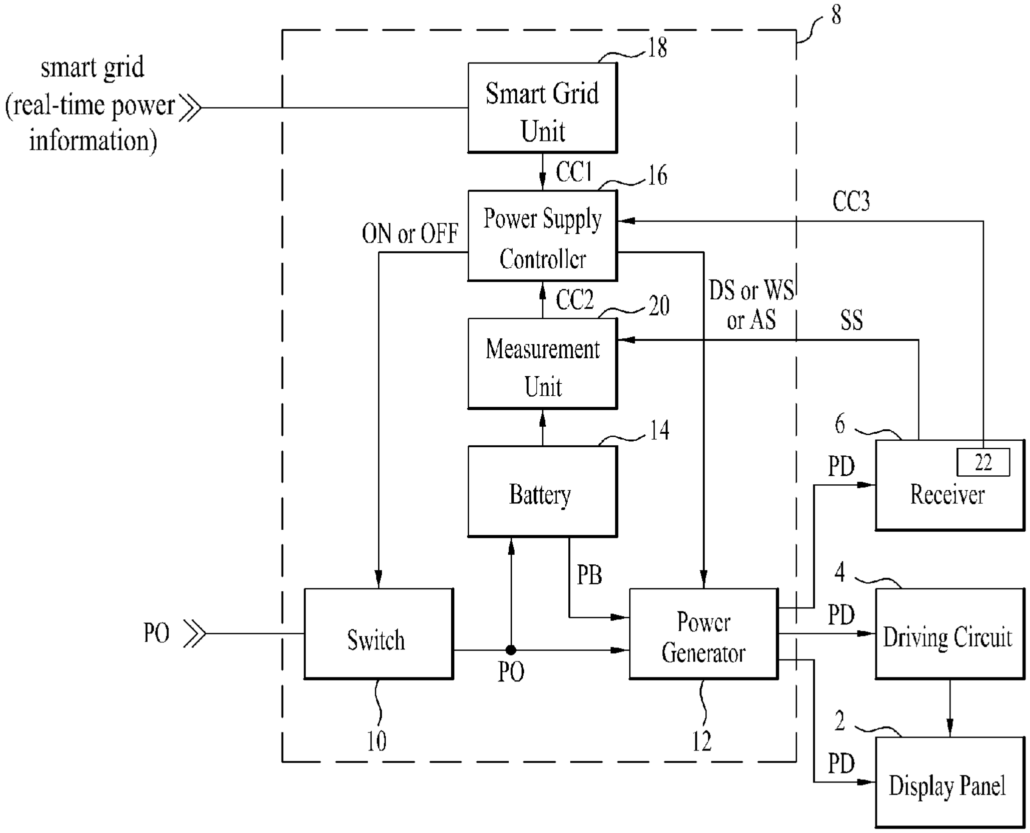
FIG. 6 is a block diagram of the flat panel display according to the third embodiment of the present invention.

FIG. 5 is a flowchart illustrating the method for driving the flat panel display according to the third embodiment, and FIG. 6 is a block diagram of the flat panel display according to the third embodiment.

The driving method of the third embodiment shown in FIG. 5 includes: sensing a user motion by a motion sensor (T8); generating driving power using a battery when there is no user motion and cutting off input of external power (T9 and T10); and supplying the driving power only to the motion sensor (T11). Steps of the driving method of the third embodiment when there is a user motion are the same as those in the second embodiment, and a description thereof will thus be replaced by the above description.

In this driving method of the third embodiment, when there is no user motion, the driving power is generated using the battery, the input of the external power is cut off, and the generated driving power is supplied only to the motion sensor. For reference, the motion sensor, which senses a user motion, is smaller in power consumption than other devices. Accordingly, in the third embodiment, when there is no user motion, the input of the external power is cut off, thereby reducing consumption of standby power. Also, the driving power generated using the battery is supplied only to the motion sensor, thereby reducing power consumption. The flat panel display according to this third embodiment will hereinafter be described in detail.

The flat panel display shown in FIG. 6 includes a display panel 2 for displaying an image, a driving circuit 4 for controlling driving of the display panel 2, a receiver 6 for receiving a user command, and a power supply unit 8 for setting a power mode to a driving mode or a standby mode according to a predefined power setting or the user command, and supplying driving power PD to the display panel 2, driving circuit 4 and receiver 6 in the driving mode and only to the receiver 6 in the standby mode. In particular, the receiver 6 includes a motion sensor 22 for sensing a user motion.

On the other hand, the components of the flat panel display of the third embodiment other than the receiver 6 and a power supply controller 16 and power generator 12 of the power supply unit 8 are the same as those in the second embodiment, and a description thereof will thus be replaced by the above description.

The motion sensor 22 periodically senses a user motion to determine whether to use external power PO. Upon determining that there is no user motion, the motion sensor 22 generates a third control signal CC3. The third control signal CC3 is a signal for cutting off input of the external power PO and generating the driving power PD using battery power BP. In this regard, when there is no user motion for a predefined reference time, the motion sensor 22 generates the third control signal CC3.

The power supply controller 16 controls the switch and the power generator 12 in response to the third control signal CC3 provided from the motor sensor 22. In detail, when the third control signal CC3 is provided, the power supply controller 16 performs a control operation to generate the driving power PD using the battery 14 instead of the external power PO and supply the generated driving power PD only to the motion sensor 22. To this end, the power supply controller 16 generates a switch off signal OFF in response to the third control signal CC3 and supplies the generated switch off signal OFF to the switch 10, and generates an absence mode signal AS in response to the third control signal CC3 and supplies the generated absence mode signal AS to the power generator 12.

The power generator 12 generates the driving power PD using the external power PO or battery power PB. The power generator 12 selectively supplies the driving power PD to the display panel 2, driving circuit 4 and receiver 6 in response to a driving mode signal DS, a standby mode signal WS or the absence mode signal AS from the power supply controller 16. In response to the driving mode signal DS, the power generator 12 supplies the driving power PD to the display panel 2, driving circuit 4 and receiver 6. On the other hand, in response to the standby mode signal WS, the power generator 12 supplies the driving power PD to the receiver 6. In particular, in response to the absence mode signal AS, the power generator 12 supplies the driving power PD only to the motion sensor 22 of the receiver 6.

As stated above, according to the present invention, in order to reduce consumption of standby power, the power supply unit contains the battery, and generates the driving power using the battery when the power mode is set to the standby mode. Also, when the power mode is set to the standby mode, the power supply unit cuts off input of the external power such that the amount of the external power consumed is zero.

Also, according to the present invention, an analysis is made of the real-time power information from the smart grid, the remaining capacity of the battery and the user motion, and the driving power is generated by selectively using the external power or battery power according to a result of the analysis. Therefore, it is possible to efficiently reduce the consumption of the standby power.

As is apparent from the above description, according to the present invention, in order to reduce consumption of standby power, a power supply unit contains a battery, and generates driving power using the battery when a power mode is set to a standby mode. Also, when the power mode is set to the standby mode, the power supply unit cuts off input of external power such that the amount of the external power consumed is zero.

Further, according to the present invention, an analysis is made of real-time power information provided from a smart grid, the remaining capacity of the battery and a user motion, and the driving power is generated by selectively using the external power or battery power according to a result of the analysis. Therefore, it is possible to efficiently reduce the consumption of the standby power.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A flat panel display, comprising:
- a display unit configured to display an image;
- a driving circuit configured to control driving of the display unit;
- a receiver configured to receive a user command; and
- a power supply unit configured to:
  - set a power mode to a driving mode or a standby mode according to a predefined power setting or the user command;
  - supply driving power:
  - in the driving mode, to the display unit, the driving circuit, and the receiver; and
  - in the standby mode, only to the receiver;
  - supply the driving power using a battery or external power according to at least one control signal;
  - analyze real-time power information provided from a smart grid and a remaining capacity of the battery; and
  - generate the driving power using the battery or the external power according to a result of the analysis.

2. The flat panel display of claim 1, wherein, when the power mode is set to the standby mode, the power supply unit, is further configured to:
- generate the driving power using the battery;
- supply the generated driving power to the receiver; and
- cut off input of the external power.

3. The flat panel display of claim 2, wherein the power supply unit comprises:
- the battery;
- a switch configured to switch the input of the external power supplied through a power plug;
- a power generator configured to generate the driving power using battery power supplied from the battery or the external power supplied from the switch; and
- a power supply controller configured to:
  - set the power mode to the driving mode or standby mode according to the power setting or user command; and
  - control the switch and the power generator according to the set power mode.

4. The flat panel display of claim 3, wherein the battery is configured to be charged using the external power when the external power is supplied.

5. The flat panel display of claim 3, wherein the power supply unit is further configured to generate the driving power using the battery when it is determined that external energy consumption is inefficient according to the result of the analysis of the real-time power information.

6. The flat panel display of claim 1, wherein:
- the power supply unit further comprises:
- the smart grid unit configured to:
- periodically analyze the real-time power information provided from the smart grid; and
- generate a first control signal upon determining, based on a result of the analysis, that consumption of the external power is inefficient;

a measurement unit configured to:

analyze the remaining capacity of the battery; and generate a second control signal upon determining, based on a result of the analysis, that the remaining capacity of the battery exceeds a predefined reference capacity; and a power supply controller configured to, when the first and second control signals are simultaneously provided, perform a control operation to:

generate the driving power using the battery; and cut off the input of the external power.

7. The flat panel display of claim 6, wherein:

the receiver comprises a motion sensor configured to:

sense a user motion, and generate a third control signal when there is no user motion for a predefined reference time; and the power supply controller of the power supply unit is further configured to operate in response to the third control signal to:

set the power mode to the standby mode; and perform a control operation to supply the driving power only to the motion sensor.

8. A method for driving a flat panel display, the flat panel display comprising a display unit for displaying an image, a driving circuit for controlling driving of the display unit, and a receiver for receiving a user command, the method comprising:

setting a power mode to a driving mode or a standby mode according to a predefined power setting or the user command;

supplying driving power:

in the driving mode, to the display unit, the driving circuit, and the receiver; and in the standby mode, only to the receiver;

supplying the driving power using a battery or external power according to at least one control signal;

analyzing real-time power information provided from a smart grid and a remaining capacity of the battery; and generating driving power using the battery or the external power according to a result of the analysis.

9. The method of claim 8, further comprising:

generating the driving power using the external power when the power mode is set to the driving mode;

when the power mode is set to the standby mode:

generating the driving power using the battery;

supplying the generated driving power to the receiver; and cutting off input of the external power.

10. The method of claim 9, wherein the battery is configured to be charged using the external power when the external power is supplied.

11. The method of claim 9, wherein the generating the driving power comprises generating the driving power using the battery when it is determined that external energy consumption is inefficient according to the result of the analysis of the real-time power information.

12. The method of claim 8, wherein the analyzing comprises:

periodically analyzing the real-time power information provided from the smart grid;

generating a first control signal upon determining, based on a result of the analysis, that consumption of the external power is inefficient;

analyzing the remaining capacity of the battery; and generating a second control signal upon determining, based on a result of the analysis, that the remaining capacity of the battery exceeds a predefined reference capacity.

13. The method of claim 12, wherein the generating the driving power comprises:

generating the driving power using the battery when the first and second control signals are simultaneously provided; and cutting off input of the external power.

14. The method of claim 13, further comprising:

sensing a user motion by a motion sensor;

generating a third control signal when there is no user motion for a predefined reference time;

setting the power mode to the standby mode in response to the third control signal; and then supplying the driving power only to the motion sensor.

* * * * *